United States Patent
Gandhi et al.

(10) Patent No.: US 10,986,152 B2
(45) Date of Patent: Apr. 20, 2021

(54) METHOD FOR DYNAMICALLY MANAGING CONTENT DELIVERY

(71) Applicant: ARRIS Enterprises LLC, Suwanee, GA (US)

(72) Inventors: Bhavan Gandhi, Vernon Hills, IL (US); Faisal Ishtiaq, Plainfield, IL (US); Anthony J. Braskich, Kildeer, IL (US); Andrew Aftelak, Palatine, IL (US)

(73) Assignee: ARRIS Enterprises LLC, Suwanee, GA (US)

(*) Notice: Subject to any disclaimer, the term of this patent is extended or adjusted under 35 U.S.C. 154(b) by 374 days.

(21) Appl. No.: 15/394,339

(22) Filed: Dec. 29, 2016

(65) Prior Publication Data

US 2018/0191796 A1 Jul. 5, 2018

(51) Int. Cl.
*G06F 15/16* (2006.01)
*H04L 29/06* (2006.01)
(Continued)

(52) U.S. Cl.
CPC ........ *H04L 65/601* (2013.01); *H04L 41/0896* (2013.01); *H04L 65/607* (2013.01);
(Continued)

(58) Field of Classification Search
CPC . H04L 65/601; H04L 41/0896; H04L 65/607; H04L 65/80; H04L 67/02; H04N 21/8456
(Continued)

(56) References Cited

U.S. PATENT DOCUMENTS 7,707,485 B2  4/2010 Laksono
7,779,097 B2  8/2010 Lamkin et al.
(Continued)

FOREIGN PATENT DOCUMENTS

WO  2006066052 A2  6/2006
WO  2009/104153 A1  8/2009
(Continued)

OTHER PUBLICATIONS

PCT International Search Report & Written Opinion, Re: Application No. PCT/US2017/065911, dated Apr. 18, 2018.

*Primary Examiner* — Kaylee J Huang
(74) *Attorney, Agent, or Firm* — Chernoff, Vilhauer, McClung & Stenzel, LLP (57) ABSTRACT

Methods and systems are provided for bitrate adaptation of a video asset to be streamed to a client device for playback. The method includes selecting a representation from a manifest which expresses a set of representations available for each chunk of the video asset and generating a dynamic manifest for the video asset in which the representation selected for the at least one chunk is recommended for streaming to the client device. The selection of the representation recommended for the chunk may be based on at least one of historic viewing behavior of previous viewers of the chunk, content analysis information for the chunk, a level of available network bandwidth, a level of available network storage, and data rate utilization information of network resources including current, average, peak, and minimum data rate of network resources.

13 Claims, 7 Drawing Sheets

(51) Int. Cl.
   *H04L 29/08*   (2006.01)
   *H04L 12/24*   (2006.01)
   *H04N 21/658*  (2011.01)
   *H04N 21/25*   (2011.01)
   *H04N 21/845*  (2011.01)
   *H04N 21/442*  (2011.01)
   *H04N 21/482*  (2011.01)

(52) U.S. Cl.
   CPC .............. *H04L 65/80* (2013.01); *H04L 67/02* (2013.01); *H04N 21/251* (2013.01); *H04N 21/44222* (2013.01); *H04N 21/4826* (2013.01); *H04N 21/6582* (2013.01); *H04N 21/8456* (2013.01)

(58) Field of Classification Search
   USPC .................... 709/219, 217, 213, 231, 233
   See application file for complete search history.

(56) References Cited

U.S. PATENT DOCUMENTS

| | | | |
|---|---|---|---|
| 8,625,607 | B2 | 1/2014 | Rieger et al. |
| 8,948,249 | B2 | 2/2015 | Sun et al. |
| 2012/0143994 | A1 | 6/2012 | Calcev et al. |
| 2013/0163758 | A1* | 6/2013 | Swaminathan ....... H04L 9/0819 380/259 |
| 2013/0332620 | A1* | 12/2013 | Gahm ................ H04N 21/6373 709/231 |
| 2014/0033036 | A1 | 1/2014 | Gaur et al. |
| 2014/0059156 | A1* | 2/2014 | Freeman, II ............ H04L 67/10 709/213 |
| 2014/0149557 | A1* | 5/2014 | Lohmar ................ H04L 65/605 709/219 |
| 2014/0173018 | A1 | 6/2014 | Westphal et al. |
| 2015/0067754 | A1* | 3/2015 | Wiser ................ H04N 21/2668 725/120 |
| 2016/0190945 | A1 | 6/2016 | Liu et al. |
| 2016/0366202 | A1* | 12/2016 | Phillips .................. H04L 43/08 |
| 2017/0353748 | A1* | 12/2017 | Van Dusen ........ H04N 21/2402 |
| 2017/0374123 | A1* | 12/2017 | Asarikuniyil ......... H04L 65/607 |
| 2018/0011828 | A1* | 1/2018 | Yadav ................... G06F 40/169 |

FOREIGN PATENT DOCUMENTS

| | | |
|---|---|---|
| WO | 2014093900 A1 | 6/2014 |
| WO | 2016/105812 A2 | 6/2016 |

* cited by examiner

PRIOR ART

METHOD FOR DYNAMICALLY MANAGING CONTENT DELIVERY

BACKGROUND

Network digital video recorders (nDVR), network personal video recorders (nPVR), remote storage digital video recorder (rs-DVR), and like equipment are network-based digital video recorders that may be stored or located on the cloud at a server location or at a content provider's location rather than at a consumer's private location or home. Such network devices have effectively increased the consumer's ability to time shift the consumption of programs (i.e., to record, download, or stream a program and ultimately consume the program or parts thereof at a later time that best suits the consumer). This ability to time shift also provides the consumer with enhanced power to consume only selected portions of programs by, for example, skipping or fast-forwarding through portions of recorded content, and also to consume parts of a program multiple times via use of rewinding or the like.

In an nDVR or time-shifted content delivery system, video content available for playback may be recorded, transcoded, and stored in several video formats. Typically, each format consists of a different video resolution and bitrate, to enable adaptive bitrate streaming. The multiplicity of different stream formats and bit rates enables the content to be sourced to devices with different capabilities, such as high definition televisions of wide ranging sizes, personal computers, tablet computers, smart phones, and other client devices. In addition, the different bit rates support adaptive streaming, whereby the receiving client has the ability to measure network congestion and request a lower or higher bit rate stream from the source which may eliminate visual impairments caused by network congestion (e.g. macro-blocking due to dropped packets, frozen frames) at the expense of higher resolution video. Any of several video delivery protocols, such as, for instance, HTTP Live Streaming, may be used to deliver the adaptive bitrate content to end users.

SUMMARY

A method of bitrate adaptation for a video asset to be streamed to a client device for playback is provided. The video asset is deliverable in a sequence of chunks available in a plurality of different representations with each representation providing a different pre-determined level of video quality due to different bitrate or video resolution encoding. The method includes a step of selecting a representation from the plurality of different representations for at least one of the chunks of the video asset from a manifest which expresses a set of representations available for each of the chunks of the video asset. The method also includes the step of generating a dynamic manifest for the video asset in which the representation selected during the selecting step for the chunk is recommended for streaming to the client device. During the selecting step, a selection of the representation recommended for the chunk is based on at least one of data of historic viewing behavior of previous viewers of the chunk of the video asset and data of content analysis information for the chunk of the video asset. The data of historic viewing behavior provides an indication of a level of historic viewer interest of each of the chunks of the video asset and the data of content analysis information provides an indication of a level of at least one of importance, relevance, and activity of each of the chunks of the video asset.

A second embodiment of a method of bitrate adaptation for a video asset to be streamed to a client device for playback includes a step of selecting a representation from a plurality of different representations for at least one chunk of a video asset from a manifest and a step of generating a dynamic manifest for the video asset in which the representation selected during the selecting step for the chunk is recommended for streaming to the client device. During the selecting step, a selection of the representation recommended for the chunk is based on at least one of a level of available network bandwidth, a level of available network storage, and data rate utilization information of network resources including at least one of current, average, peak, and minimum data rate of network resources.

A system of bitrate adaptation for a video asset to be streamed to a client device for playback is also provided. The system comprises electronic apparatus having at least one processor configured to select a representation from a plurality of different representations for at least one chunk of a video asset from an existing manifest which expresses a set of representations available for each chunk of the video asset and generate a dynamic manifest for the video asset in which the representation selected for the chunk is recommended for streaming to the client device.

A second embodiment of a system of bitrate adaptation for a video asset to be streamed to a client device for playback includes a delivery network server configured to receive data of historic user behavior corresponding to a video asset, data of content event information derived from media analysis of the video asset, and a manifest for the video asset that expresses a set of representations available for each chunk of the video asset and to generate activity information of historic user behavior and content event information for each of the chunks of the video asset. The system also includes a local network gateway device that characterizes local network activity and an indication of which manifest bit-rate ranges are best suited for a local network environment. The local network gateway device is configured to receive the activity information from the delivery network server and select representations for the chunks of the video asset to be streamed based on the activity information and local network cache and bandwidth usage.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

As discussed above, bitrate adaptation (i.e., the selection of the stream to receive and present) has conventionally been performed at the client, and has been determined based solely on download speed and client resources. As a result, bitrate decisions may result in either poor video presentation or (conversely) unnecessarily wasted bandwidth and may not directly account for network resource loads. Thus, conventional bitrate adaption techniques may lead to poor performance at the client side and an increased slowness on the network side.

Thus, according to some embodiments disclosed herein, a method and system are provided that modifies the conventional bitrate adaptation decision to optimize presentation and bandwidth usage.

In addition, according to other embodiments disclosed herein, a method and system are provided that proactively manage a network load across all client sessions by considering a current state of the delivery network when adapting bitrates sent to clients served by network resources.

Accordingly, these methods provide a proactive system that may determine relative importance of content segments from historic user interactions or content information for purposes of optimizing adaptive bitstream delivery. Furthermore, this optimization may be combined with network activity information to provide a more proactive adjustment to the load of the delivery network.

Dynamic Manifest Mapping Optimizing QoS for nDVR Content Delivery

According to a first embodiment, information about the content, which can be used to influence a bitrate adaptation decision, may include historic viewing behavior data and content media analysis data.

With respect to viewing behavior data, such data may be obtained through collection of user interactions while watching content, such as fast forward, rewind, pause, play, stop, skip ahead, skip back/replay, slow motion, and other similar commands that affect the playback of the video. Often, these interactions occur via a remote control while watching the content on a primary (TV) screen, but could also occur on a secondary (phone/tablet) device, in a web browser on a computer, or any other manner in which video can be delivered. Interactions for many viewers can be collected and analyzed. When such historic information is viewed in aggregate, it may indicate portions of content which may have been of lower interest (many fast forward or skip ahead events) or of higher interest (many rewinds or replay events) during past viewings of the content.

With respect to content media analysis data, such data may be obtained through automated analysis of video, audio and text components of a video asset. This analysis can determine several features of the video asset, including scene changes, identification of advertisements, level of activity or motion, relative importance or relevance of segments, and similar information.

According to an embodiment, a so-called Dynamic Manifest Manipulator or Mapper is configured to receive, as an input, user behavior related to a content stream or video asset and/or input content event stream (temporal metadata) derived from media analysis of the content or video asset. Further, the Dynamic Manifest Manipulator is configured to receive input of a manifest file for the content or video asset and create a new manifest file (also referred to as a "dynamic manifest file") based on the above referenced inputs. Accordingly, knowledge of historic or past user behavior with respect to viewing the content or video asset permits a more efficient and effective manifest file to be created for delivery of the content or video asset based on semantic and user value.

For purposes of example, a video asset ($A_i$) is referenced by a time parameter (t) with values ranging from $[0, T_i]$. The viewing behavior data ($V_i$) for the video asset ($A_i$) can be expressed for any point in time (t) of the video asset. Thus, by definition, the value of $V_i(t)$ indicates a level of interest or importance of a section of content (for instance, a higher value may correspond to a higher viewer interest level and a lower value may correspond to a lower viewer interest level).

In a similar manner, a measure of importance or relevance from media analysis data ($E_i$) for the video asset ($A_i$) can be expressed for any time (t) within the video asset, for instance, with higher values of $E_i(t)$ corresponding to higher levels of importance, relevance, or activity. Thus, for each time parameter in a video asset, a relative level of viewing behavior and a relative level of importance, relevance, or activity may be ascertained.

As discussed above with respect to adaptive streaming, each video asset ($A_i$) may have several representations, each at a different video bitrate and/or resolution. As an example, each video asset ($A_i$) may have "n" different representations, each representation (j) having an affiliated bitrate: $b_j$, $j \in [1, n]$. The bitrates are ordered $b_1 < \ldots < b_n$ and lower bitrates generally correspond to lower fidelity video quality due to the lower video encoding bitrate and/or lower video resolution. Conversely, higher bitrates generally correspond to higher fidelity video quality due to higher video encoding bitrate and/or higher video resolution A manifest ($M_i$) expresses for asset ($A_i$) the set of bitrate representations available for the asset ($A_i$), and, for a time (t), indicates the content chunks available for playback in each of the bitrate representations. In adaptive bitrate streaming, the video asset ($A_i$) is chunked into discrete time portions, which potentially permits the playback of each chunk at a different bitrate. As an example, each chunk may correspond to 2 to 10 seconds of video during playback; of course, other chunk lengths are also possible. Thus, the asset ($A_i$) may be indexed by integer chunk numbers (c, $c \in [0, C_i]$). Effectively, a surjective time mapping function may map each time value onto a corresponding chunk ($\Theta(t_0) = c_0$).

According to an embodiment, an extension referred to as a dynamic manifest ($DM_i$) may be generated in addition to the typical manifest ($M_i$) for asset ($A_i$). The dynamic manifest ($DM_i$) indicates an individually recommended bitrate stream (j) for each chunk (c) as opposed to the use of the same bitrate representation for all chunks of a video asset.

Thus, different bitrate representations may be recommended for different chunks comprising a single video asset The recommended stream by the dynamic manifest ($DM_i$) is determined based on the content information, i.e., viewing behavior data ($V_i$) and media analysis data ($E_i$), for the time period affiliated with the particular chunk (c).

According to an embodiment, discrete content information functions may be produced. Thus, for example, a continuous time function ($V_i(t)$) corresponds to a discrete time function ($V_i(c)$). Thus, for example, a time range $t \in [t_1, t_2]$ may map onto a single content chunk (c), i.e., $\forall t \in [t_1, t_2]$, $(\Theta(t)=c)$. The value of $V_i(t)$, $t \in [t_1, t_2]$ may be averaged and mapped onto one of the discrete bitrate values [1, n]. A similar procedure may be performed for the creation of $E_i(c)$ from $E_i(t)$.

Accordingly, for each chunk (c) in an asset ($A_i$), functions $V_i(c)$ and $E_i(c)$ are assigned a discrete bitrate value [1, n]. A relatively lower value (e.g., 1) may correspond to viewing behavior data and content media analysis data that indicate, respectively, that the user engagement with this particular content portion and the importance or relevance of this particular content portion is relatively low. As a result, a lower bitrate may be appropriate for this chunk (c). The converse may be true for higher values (e.g., n).

The values of functions $V_i(c)$ and $E_i(c)$ may be combined in any suitable manner to determine the dynamic manifest recommended bitrate ($DM_i$) of asset ($A_i$). As an example of one embodiment, the combining function may be that of the maximum: $DM_i(c)=\max(V_i(c), E_i(c))$. Other examples include embodiments that employ the minimum value (min ($V_i(c)$, $E_i(c)$)) or that average the values (avg($V_i(c)$, $E_i(c)$)) for providing a combining function.

Accordingly to some embodiments, the rate of change of the bitrate from one chunk to the next may be limited on the basis that a significant bitrate change may be visually jarring during playback. For example, the change rate between adjacent chunks of video may be limited to one step in bitrate per chunk. Thus, a rate limited dynamic manifest recommended bitrate ($RLDM_i(c)$) for chunk number (c) may be expressed, as follows:

if $DM_i(c)-RLDM_i(c-1)>1$, then $RLDM_i(c)=RLDM_i(c-1)+1$; or if $DM_i(c)-RLDM_i(c-1)<1$, then $RLDM_i(c)=RLDM_i(c-1)-1$; or otherwise $RLDM_i(c)=DM_i(c)$.

Further, the range of bitrates for certain portions of the video asset may be restricted, such as to guarantee a minimum bitrate for advertising. In particular, the content media analysis data can produce additional information about the content at a particular point in time; this information may indicate an advertisement, for example. The operator of a video delivery service may provide guarantees about the quality of service (QoS) of advertising being presented. Thus, when a chunk (c) contains an advertisement, the dynamic manifest recommended bitrate may be modified so that it is larger than some predetermined limiting value (e.g., limit=2). In such a case, for example, $DM_i(c)$ may be set to equal $\max(V_i(c), E_i(c), \text{limit})$.

For purpose of communicating dynamic manifest information to clients, the dynamic manifest recommended bitrate is determined for each chunk of the video asset and communicated to the client, that is, the device that is receiving the video chunks and playing the video for the user. According to one embodiment, the $DM_i$ or $RLDM_i$ values may be carried in a Master Playlist. If HTTP Live Streaming is the protocol used for delivery, the dynamic manifest information may be carried, for instance, in the EXT-X-SESSION-DATA tag. The EXT-X-SESSION-DATA tag permits arbitrary session data to be carried in a Master Playlist. In particular, the DATA-ID field of this tag may be set to indicate that the data describes dynamic manifest recommended bitrate information, and the VALUE field of this tag may contain, for example, the chunk number and the recommended bitrate value for several chunks. This information can be encoded in JavaScript Object Notation (JSON) format, for example, or any suitable serialization format. For example, see the following format: [{chunk: 3401, bitrate: 3}, {chunk: 3402, bitrate: 3}, {chunk: 3403, bitrate: 2}]. The EXT-X-SESSION-DATA tag may be updated continuously or continually in the Master Playlist as new chunks of the video asset become available.

Accordingly, the client can receive the EXT-X-SESSION-DATA when it downloads a playlist, and the client may follow the bitrate suggestions explicitly, downloading the recommended bitrate for each chunk. Alternatively, the client may use the recommended bitrate information to alter the bitrate choice for a chunk, without following the recommendation exactly. By way of example, if a client's algorithm (based on download speed and client performance) indicates that a bitrate "4" of a certain chunk is to be used, while the dynamic manifest recommended bitrate indicates a bitrate "2", then the client may average these decisions and select a bitrate "3" for the chunk.

In an alternative embodiment, the dynamic manifest information may not be carried explicitly in the Master Playlist. For instance, this embodiment may be useful if the client does not implement the behavior to use the recommended bitrate information. In HTTP Live Streaming, a Master Playlist contains an entry for each available bitrate, with each entry indicating a bandwidth (bitrate) value, and a link to the media playlist corresponding to the bitrate. Further, a media playlist for each bitrate is also created and updated. In this embodiment, dynamic manifest information may be used to create an additional media playlist, so that if there are (n) available bitrates, then there will be n+1 media playlists. Normally, a media playlist contains only chunks of the video asset for a single bitrate. The additional media playlist, which may be called a dynamic manifest media playlist, may contain a link to each chunk corresponding to the recommended bitrate. Thus, a client may realize the recommendation of the dynamic manifest simply by playing the chunks indicated in the dynamic manifest media playlist.

Further embodiments may create multiple dynamic manifest media playlists. For instance, a primary dynamic manifest media playlist may be defined as the playlist containing chunks according to $DM_i(c)$ discussed above. Then, a lower bitrate dynamic manifest media playlist mat be created to contain chunks according to $\max(DM_i(c)-p, 1)$, where, for example, p=1. Similarly, a higher bitrate dynamic manifest media playlist may be created and contain chunks according to $\min(DM_i(c)+p, n)$. In other words, these provide alternate versions of the dynamic manifest recommendations by shifting all recommended bitrates up or down by a fixed number of steps. Using this procedure, a set of dynamic manifests can be created for use by the client.

A set of dynamic manifests may be provided to a client for the purposes of achieving several advantages. First, the client implementation and behavior need not be aware of the dynamic manifest operation; thus, this technique may be used with legacy clients. Second, it offers the client the ability to change the bitrate of the stream being played in response to network speed and other client performance factors. Third, it may offer the benefits of the dynamic manifest recommendation, namely, to cause the client to download and play lower or higher bitrate chunks in response to the characteristics of the video itself.

Figure 1:
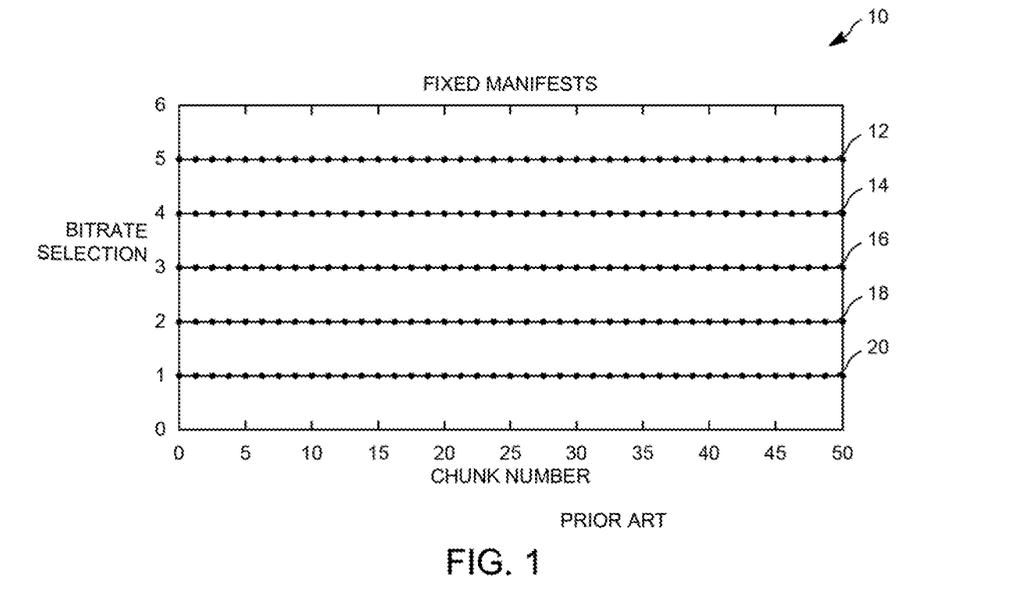
FIG. 1 is a graph showing a set of fixed manifests for a video asset in which a constant bitrate selection is provided for all chunks of the video asset according to the prior art.

To illustrate the use of dynamic manifests, consider the example titled "Fixed Manifests" 10 shown in FIG. 1, which represents the conventional operation of a protocol such as HTTP Live Streaming. In FIG. 1, there are n=5 bitrates offered for the video asset. As a result, there are five media playlists listed within the master playlist, one for each bitrate. Each media playlist and the chunks it contains are represented by one of the straight horizontal lines in the graph, 12, 14, 16, 18 and 20. Thus, for a bitrate selection of "3", the middle horizontal line 16 in FIG. 1 represents a media playlist where each and every chunk of the video asset contains video encoded at only bitrate "3". The client can choose to play chunks from any playlist as it plays back the content.

Figure 2:
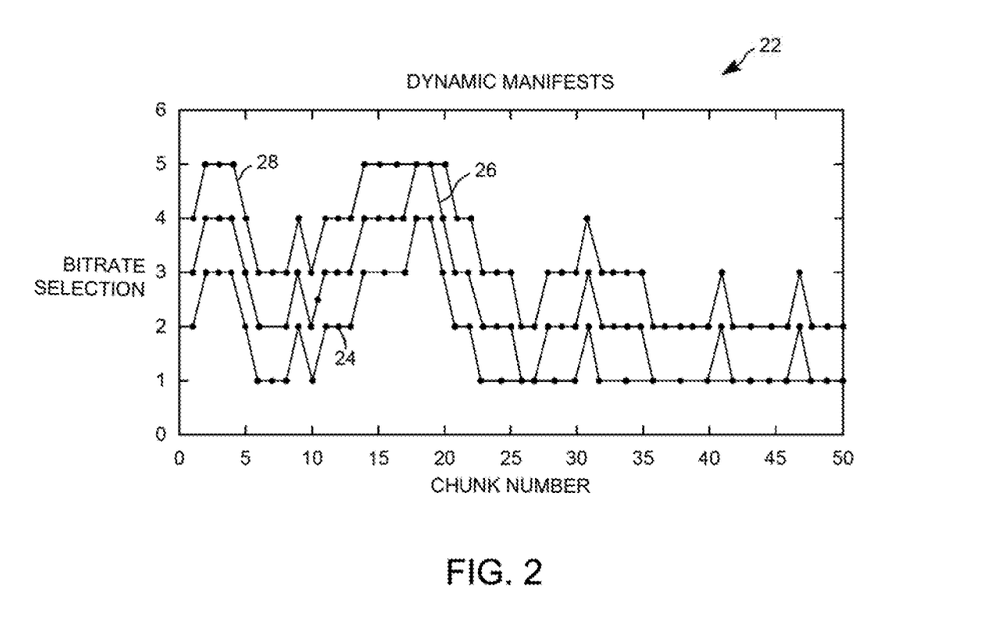
FIG. 2 is a graph showing a set of dynamic manifests for a video asset in which bitrate selections vary form chunk-to-chunk based on differences in historic user behavior and content analysis information for each chunk in accordance to an embodiment.

In contrast, FIG. 2 depicts an example titled "Dynamic Manifests" 22 according to an embodiment. In this example, there are three dynamic manifest media playlists offered for the video asset, each represented by a different relatively jagged line, 24, 26, and 28, in the graph. Similar to the previous Example, there are n=5 bitrates. Line 26 represents the primary dynamic manifest media playlist, the upper line 28 represents a higher bitrate dynamic manifest media playlist, and the lower line 24 represents a lower bitrate dynamic manifest media playlist. As shown in FIG. 2, line 26 may be located between lines 24 and 28 or, for some chunks, line 26 may overlap or be the same as line 24 or 28. If the client selects only the primary playlist 26, it will receive chunks at various bitrates (between 1 and 5) as it plays the content. However, the client has the flexibility to change to a lower or higher bitrate playlist, 24 or 28, depending on client conditions. Playlist 24 includes chunks at various bitrates between 1 and 4, and playlist 28 includes various bitrates between 2 and 5.

A system 30 for dynamic manifest mapping that optimizes Quality of Service (QoS) for content delivery as discussed above is shown in FIG. 3. The nDVR 32 may be located in the cloud or like location and content or video assets may be delivered therefrom via a content delivery network (CDN) 34 to client devices (i.e., set top box, computer, tablet computer, smart phone, etc.) 36 located at the consumer location. The nDVR 32 may be configured with an Analytics system 38, electronic program guide metadata 40, subscriber account information 42, a scheduler 44, and a fulfillment manager 46. Video streams from a source may be received by a multiplexor 48 and may be encoded by a transcoder 50. Linear video streams may be fed directly from the transcoder 50 to the CDN 34 and ultimately to the client devices 36. The transcoder 50 may also provide multi-bitrate (MBR) transport streams (TS) to recorders 52 communicating with a recorder control module (RCM) 56. The RCM 56 communicates with the nDVR 32 via a recorder (RM) 58, and the recorders 52 communicate with the nDVR 32 via media analysis framework (MAF) equipment 60.

Figure 3:
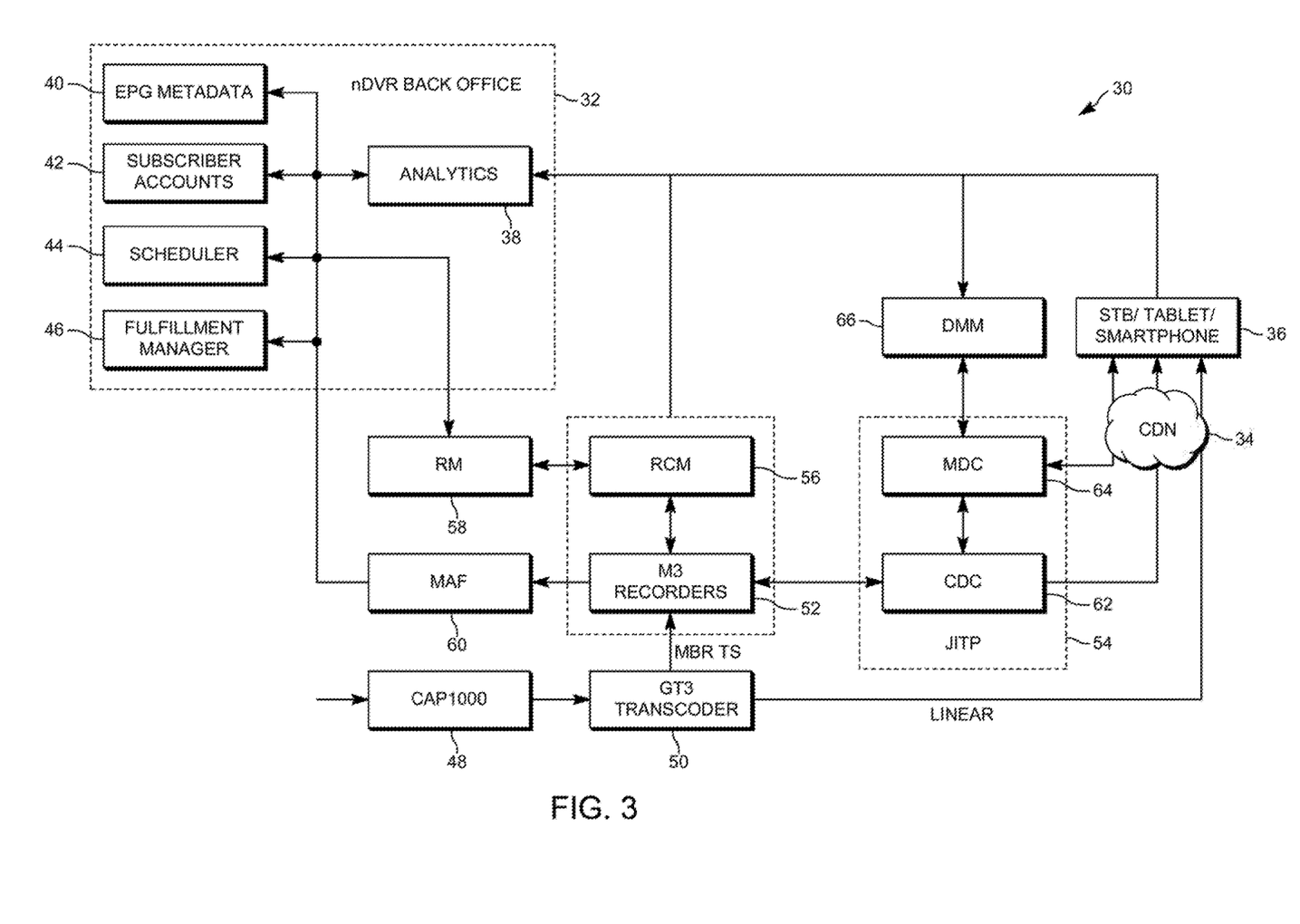
FIG. 3 is a schematic view of a system for generating and delivering a dynamic manifest file to client devices in accordance to an embodiment.

The recorders 52 also communicating with a packager 54 having a content delivery controller (CDC) 62 and a manifest delivery controller (MDC) 64 which in turn communicates with the CDN 34 and client devices 36. Finally, for providing the dynamic manifest discussed above, a Dynamic Manifest Mapper (DMM) 66 communicates with the nDVR 32 and the MDC 64.

The above arrangement permits analytics to be collected from information of users' interactions with content (linear and/or recorded), for instance, FF, REW, PAUSE, and the like. In addition, recorded content may be analyzed to create activity stream (low-level & semantic) that is input into the analytics system 38. The DMM 66 creates a reference map and sequence of content chunks that is usage and content aware either at a subscriber or Service Group level as described above.

Figure 4:
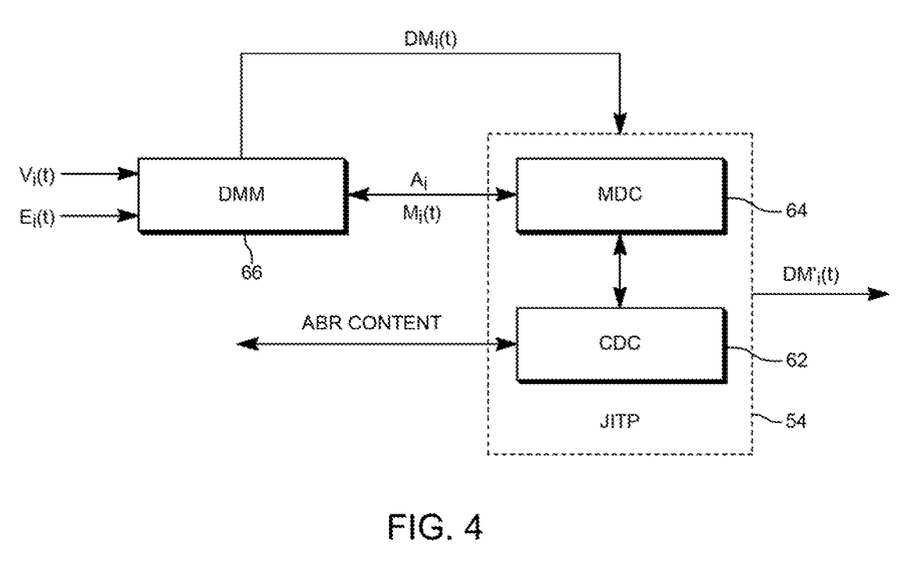
FIG. 4 is a schematic view of a packager and dynamic manifest mapper in accordance to an embodiment.

As best shown in FIG. 4, the DMM 66 receives as inputs from the analytics system 38 of the nDVR 32: $V_i(t)$ (i.e., user viewing behavior stream for video asset $A_i$); and $E_i(t)$ (i.e., media analysis generated event stream for video asset $A_i$). In addition, the DMM 66 may receive $A_i$ (Video Asset Content being played back) and $M_i(t)$ (i.e., a manifest file for $A_i$) from the MDC 64 of the packager 54. Following the above referenced process, the DMM 66 provides an output to the packager 54 of $DM_i(t)$ (i.e., a Dynamic Manifest Map for $A_i$; reference navigation hints through manifest/content chunks that are content and usage behavior aware as discussed above). This may represent a custom playlist from mixed bit-rates that the client can use and can be sent along with the manifest files. The packager 54 also receives the adaptive bit rate (ABR) content of the video asset and forwards $DM'_i(t)$ (i.e., a manifest file with the associated $DM_i(t)$) to the client(s) 36.

Figure 7:
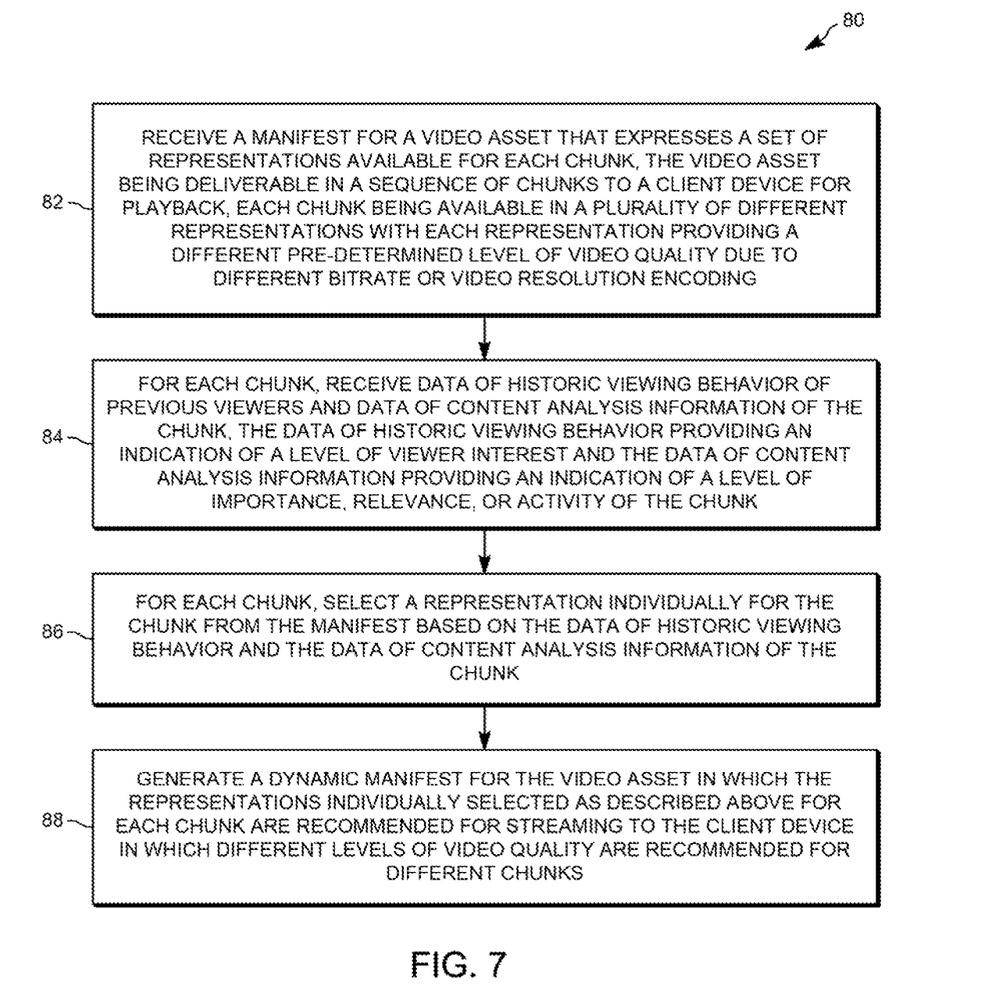
FIG. 7 is a flow diagram of a method of bitrate adaptation in accordance to an embodiment.

A flow diagram of method 80 corresponding to the above embodiment is provided in FIG. 7. In step 82, a manifest for a video asset that expresses a set of representations available for each chunk is received. The video asset is of a type that is deliverable in a sequence of chunks to a client device for playback, with each chunk being available in a plurality of different representations and with each representation providing a different pre-determined level of video quality due to different bitrate or video resolution encoding.

For each chunk, data of historic viewing behavior of previous viewers and data of content analysis information of the chunk is received in step 84. As discussed above, the data of historic viewing behavior provides an indication of a level of viewer interest and the data of content analysis information provides an indication of a level of importance, relevance, or activity of the chunk. Also for each chunk, a representation is individually selected in step 86 for the chunk from the manifest based on the data of historic viewing behavior and the data of content analysis information of the chunk.

Thereafter, in step 88, a dynamic manifest for the video asset is generated in which the representations individually selected as described above for each chunk are recommended for streaming to the client device in which different levels of video quality are recommended for different chunks.

Dynamic Manifest Mapping Optimizing for Content Delivery Network Resources

According to another embodiment, information about network resource utilization may be collected across a set of output transport streams by instrumented network delivery resources. The type of information collected may include {Curr, Ave, Peak, Min} corresponding to {Current, Average, Peak, Minimum} data rate, which is indicative of utilization of network resources. For Edge QAMs (such as APEX 1000 manufactured by Arris Group, Inc.), data rate utilization information is collected. Similar information can be gathered from appropriately instrumented network resource managers that oversee the delivery of IP bit streams.

In an IP delivery system, the above referenced information may be used to adaptively change or recommend the video manifest sequence that actively mitigates server-side network congestion. According to embodiments disclosed herein, a network aware manifest manager (NMM) actively manages the recommended delivery of video chunks.

By way of example, a network resource manager may receive information concerning network activity across a number of active playback sessions, network bandwidth, and network storage. In addition, a number of manifests may be input into the network resource manager. From these inputs, the network resource manager may create a new set of manifests based on the information provided concerning network utilization, user behavior, content semantics across multiple streams and thereby produce more efficient delivery across multiple streams by more effective usage of network resources.

By way of example, each video asset ($A_i$) may have several representations, each at a different video bitrate and/or resolution. For instance, each asset ($A_i$) may have (n) representations. Each representation may have an affiliated bitrate $b_j$, $j \in [1, n]$. The bitrates are ordered $b_1 < \ldots < b_n$ and lower bitrates generally correspond to lower fidelity video quality due to the lower video encoding bitrate and/or lower video resolution and higher bitrates generally correspond to higher fidelity video quality due to the higher video encoding bitrate and/or higher video resolution.

According to an embodiment, discrete network utilization functions ($N_i(t)$) are produced. For instance, for a time range $t \in [t_1, t_2]$ which maps onto a single content chunk c, $\forall t \in [t_1, t_2]$, ($\Theta(t)=c$), the discrete network utilization function ($N_i(t)$) is mapped onto one of the discrete bitrate values or functions [1, n]. This creates a recommended trace, $NM_i(t)$ through either $M_i(t)$ or $DM_i(t)$, discussed above, that is aware of network resource utilization. If the NMM is aware of high network resource utilization (e.g., there is currently high throughput and/or limited additional network capacity), then the value of $NM_i(t)$ may be lower than the value of $DM_i(t)$. This would have the effect of indicating to the client to use a representation with a lower bitrate for the chunk at time t. On the other hand, if there is significant available network capacity, $NM_i(t)$ may take a value higher than $DM_i(t)$. At other times, $NM_i(t)$ may be the same value as $DM_i(t)$.

In some embodiments, it may be preferable to limit the rate of change of the bitrate from one chunk to the next, because a significant bitrate change may be visually jarring. By way of example, the change rate may be limited to one step in bitrate per chunk.

For purposes of communicating dynamic manifest information to clients, as the dynamic manifest recommended bitrate is determined for each chunk of a video asset, the recommended bitrate value is communicated to the client, that is, the device that is receiving the video chunks and playing the video for the user. This may be accomplished in the same manner as previously described.

Figure 5:
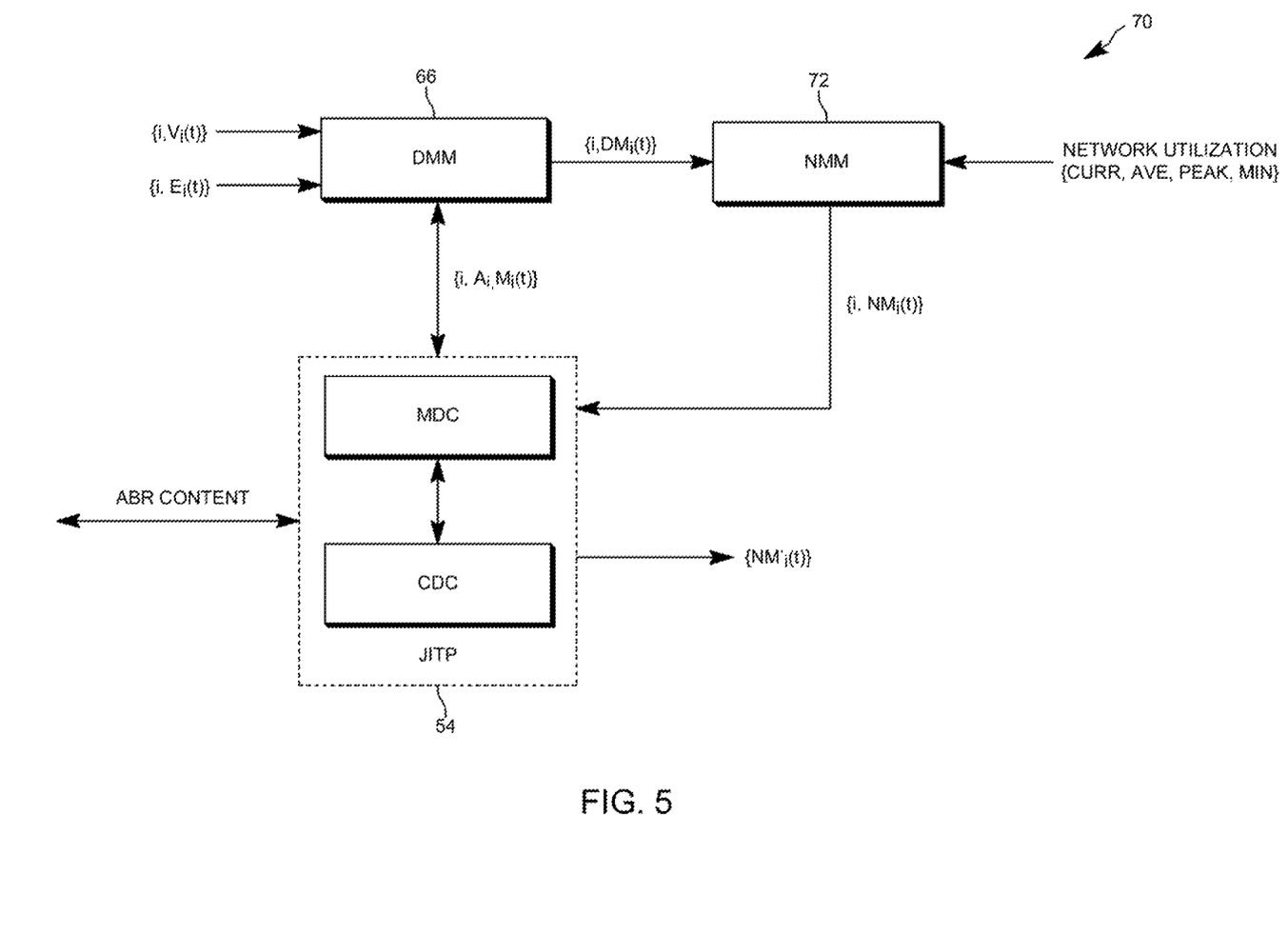
FIG. 5 is a schematic view of a packager, dynamic manipulator mapper, and network-aware manifest manager in accordance to an embodiment.

FIG. 5 provides an example of a system 70 in which a Network-aware Manifest Manager (NMM) 72 is utilized in association with a Dynamic Manifest Mapper (DMM) 66 and packager 54 discussed above. The DMM 66 creates an array of manifest maps, $DM_i(t)$ where $1 \leq i \leq N$ and N=number of active playback sessions in which the suggested manifest playback is based on user behavior and media content activity (i.e., $V_i(t)$ and $E_i(t)$).

The NMM 72 modulates the suggested manifest playback based on content delivery network activity. For example, the NMM 72 may receive as an input: the $DM_i(t)$ (i.e., a Dynamic Manifest Map for video asset $A_i$ as discussed above) from the DMM 66; and network utilization information (Curr, Ave, Peak, Min) such as from a network resource manager or like equipment. As an alternative, if a DMM 66 is not utilized or if user behavior and media content activity (i.e., $V_i(t)$ and $E_i(t)$) are not known, the NMM 72 may receive a regular manifest, $M_i(t)$, that has not been subject to adjustment based on user behavior and media significance.

With the above information, a Network Modified manifest map $NM_i(t)$ is generated and output by the NMM 72 over a specified time window (representing some number of chunks). The packager 54 sends $NM'_i(t)$ (which is the Manifest file with the associated $NM_i(t)$) to the client device(s) 36.

Figure 8:
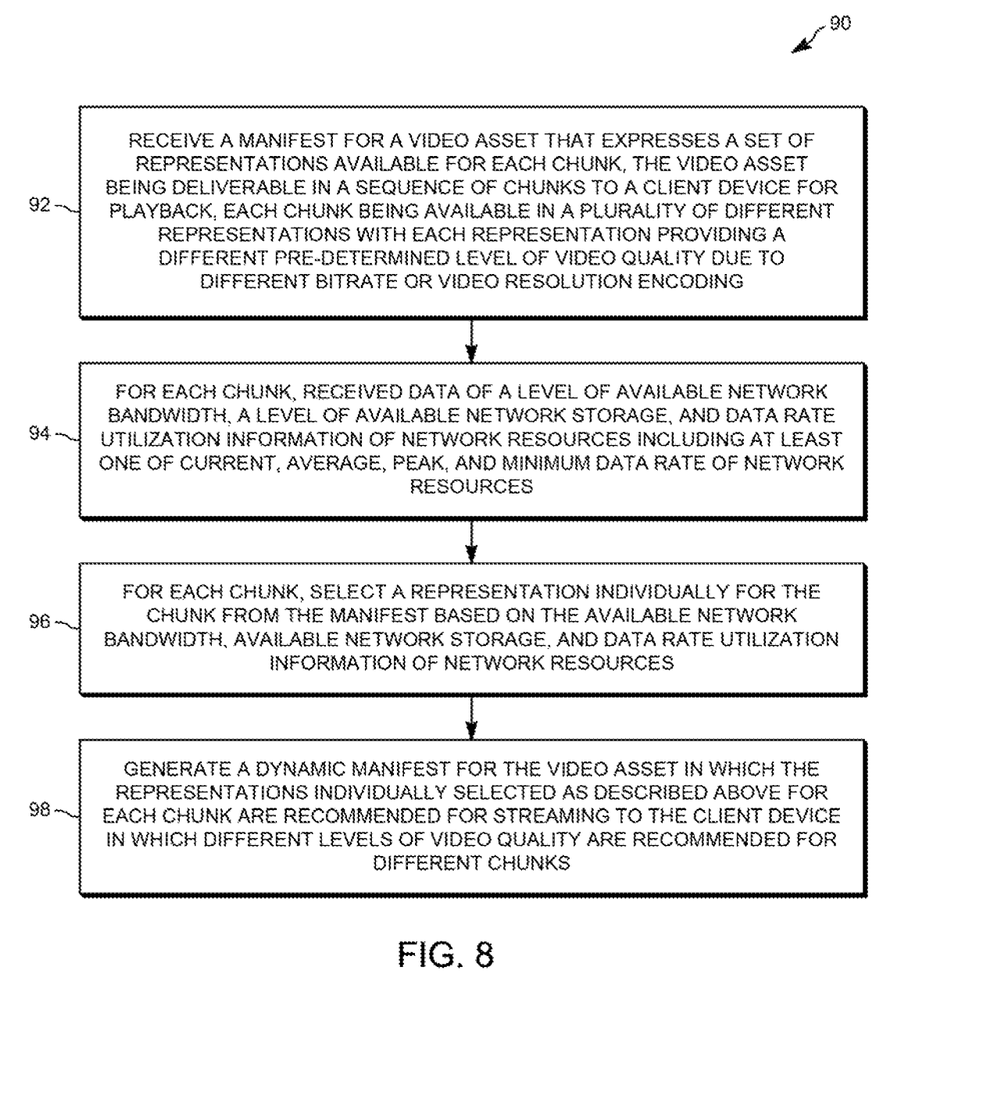
FIG. 8 is a flow diagram of a method of bitrate adaptation in accordance to an embodiment.

A flow diagram of method 90 corresponding to the above embodiment is provided in FIG. 8. In step 92, a manifest for a video asset is received. The video asset is of a type that is deliverable in a sequence of chunks to a client device for playback, with each chunk being available in a plurality of different representations and with each representation providing a different pre-determined level of video quality due to different bitrate or video resolution encoding.

For each chunk, data of a level of available network bandwidth, a level of available network storage, and/or data rate utilization information of network resources including at least one of current, average, peak, and minimum data rate of network resources is received in step 94. Also for each chunk, a representation is individually selected in step 96 for the chunk from the manifest based on the data of a level of available network bandwidth, a level of available network storage, and/or data rate utilization information of network resources.

Thereafter, in step 98, a dynamic manifest for the video asset is generated in which the representations individually selected as described above for each chunk are recommended for streaming to the client device in which different levels of video quality are recommended for different chunks.

Home Resource Manager

According to a further embodiment, a home or local gateway acts as proxy for receiving and disseminating IP streams to a plethora of clients at the client or home or local location. Accordingly, the functionality discussed above may be modified and combined to perform local management of IP bitstream manifests. Such an embodiment provides the ability to locally optimize delivery to individual devices in the local home gateway.

By way of example, a so-called "Fusion Service" can be provided with use of a local Dynamic Manifest Mapper (DMM). Equipment providing the fusion service may receive as an input user behavior related to a content stream or asset (fusion server), content event stream (temporal metadata) derived from media analysis, and a manifest file for the content. From this information, the equipment may create an activity map of content/user behavior for streams destined for a home gateway. A local network or home resource manager of the home gateway may provide characterization of in-home or local network activity and an indication of which manifest bit-rate ranges are best suited for the local environment. A local DMM of the home gateway may provide a reference navigation of manifest chunks that take into account user behavior, content activity, and local network cache and bandwidth usage thereby managing the bandwidth and storage resources in the home for more efficient delivery in the home.

Figure 6:
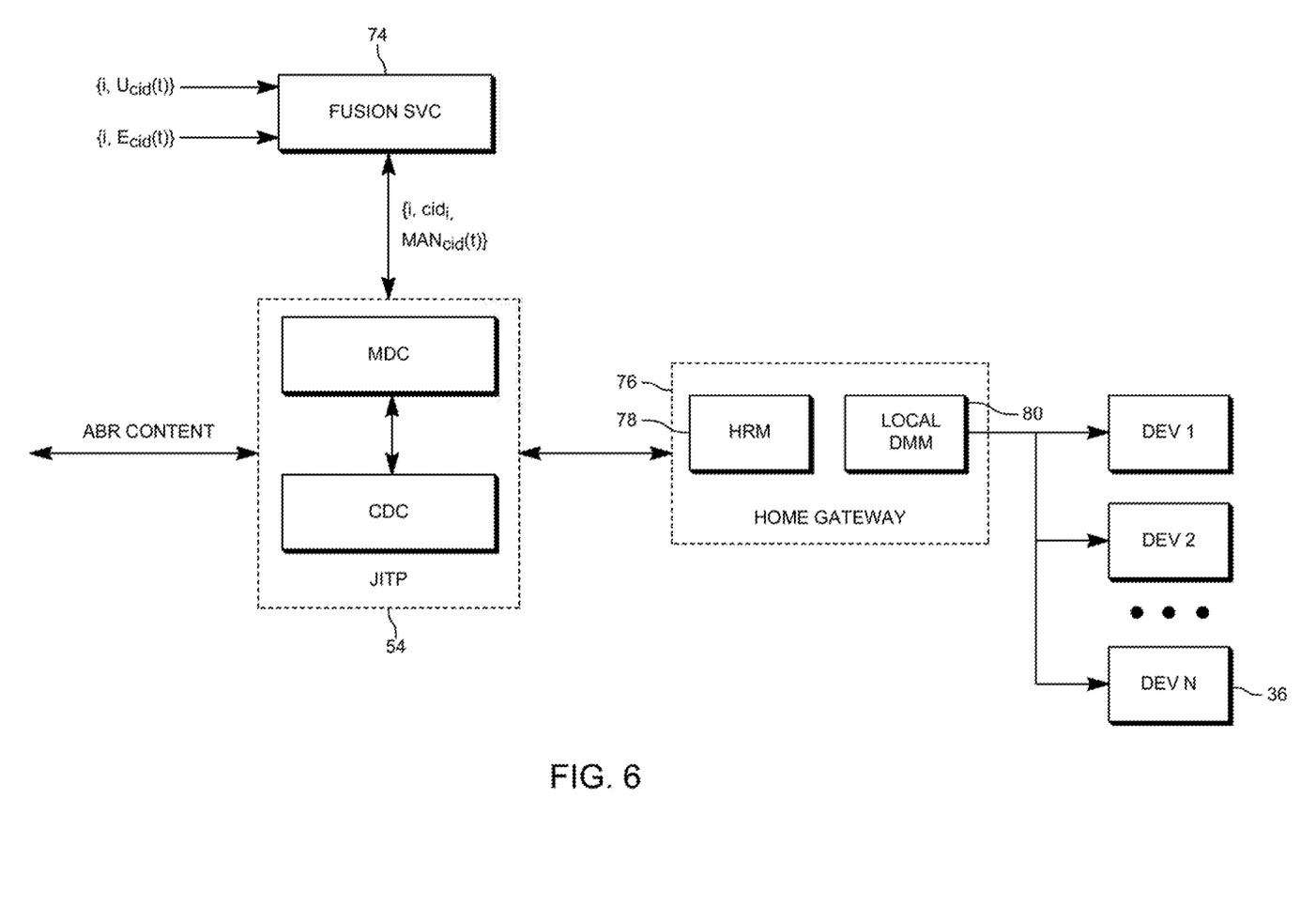
FIG. 6 is a schematic view of a fusion service server, packager, and home gateway in accordance to an embodiment.

As shown in FIG. 6, Fusion Service equipment 74 creates a representation of user interactions/activity and content behavior and outputs an activity map of content that may be embedded with the manifest files. This may be received by the packager 54 and forwarded to the home gateway 76. The Home Resource Manager (HRM) 78 provides characterization of in-home activity and an indication of which manifest bit-rate ranges may be best suited for the local environment. The Local DMM 80 provides a reference navigation of manifest chunks that take into account user behavior, content activity, and local network cache and bandwidth usage. Accordingly, appropriate adaptive bitrate content is streamed to the client devices 36.

A system for carrying out any of the above disclosed methods may include software or the like provided on a circuit board or within another electronic device and can include various processors, microprocessors, modules, components, controllers, chips, disk drives, and the like. It will be apparent to one of ordinary skill in the art that systems, modules, components, processors, servers, and the like may be implemented as electronic components, software, hardware or a combination of hardware and software for purposes of providing a system.

Embodiments may also include at least one non-transitory computer readable storage medium having computer program instructions stored thereon that, when executed by at least one processor, can cause the at least one processor to perform any of the steps described above.

While the principles of the invention have been described above in connection with specific devices, apparatus, systems, algorithms, and/or methods, it is to be clearly understood that this description is made only by way of example and not as limitation. One of ordinary skill in the art will appreciate that various modifications and changes can be made without departing from the scope of the claims below.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented, and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of bitrate adaptation for a video asset to be streamed to a client device for playback, the video asset being deliverable in a sequence of chunks available in a plurality of different representations with each representation providing a different pre-determined level of video quality due to different bitrate or video resolution encoding, comprising the steps of:

selecting a representation from the plurality of different representations for at least one of the chunks of the video asset from a manifest which expresses a set of representations available for each of the chunks of the video asset; and generating a dynamic manifest for the video asset in which the representation selected during said selecting step for the at least one of the chunks is recommended for streaming to the client device;

wherein, during said selecting step, a selection of the representation recommended for the at least one of the chunks is based on selection information comprising each of:

data of historic viewing behavior of previous viewers of the at least one of the chunks of the video asset, obtained through collection of user interactions while watching content and data of content analysis information for the at least one of the chunks of the video asset; and wherein the data of historic viewing behavior provides an indication of a level of historic viewer interest of each of the chunks of the video asset and the data of content analysis information provides an indication of a level of at least one of importance, relevance, and activity of each of the chunks of the video asset.

2. The method according to claim 1, wherein, during said selecting step, a representation providing a higher pre-determined level of video quality is selected for a chunk having historic viewer interest of a pre-determined threshold or having at least one of importance, relevance, and activity of a pre-determined threshold.

3. The method according to claim 1, wherein said selecting step is repeated for each of the chunks of the video asset, and wherein the dynamic manifest includes a recommendation for at least one of the chunks of a pre-determined level of video quality that is different from a recommendation of a pre-determined level of video quality recommended for at least one other of the chunks of the video asset.

4. The method according to claim 1, wherein, during said selecting step, the selection information is mapped to one of the pre-determined levels of video quality.

5. The method according to claim 1, wherein, during said selecting step, the representation selected for the at least one of the chunks of the video asset to be streamed to the client device corresponds to at least one of a minimum, a maximum, and an average of a level of the historic viewing behavior and a level of the content analysis information.

6. The method according to claim 1, wherein a rate of change of a level of video quality recommended for any two adjacent chunks of the video asset is limited to a predetermined number of levels of video quality.

7. The method according to claim 1, further comprising the step of communicating the dynamic manifest to the client device in at least one of a master playlist and an EXT-X-SESSION-DATA tag of HTTP Live Streaming protocol.

8. The method according to claim 1, further comprising the steps of:

modifying the representation recommended for at least one of the chunks of the video asset to be streamed to the client device as selected during said selecting step based on at least one of a level of available network bandwidth, a level of available network storage capacity, and data rate utilization information of network resources including at least one of current, average, peak, and minimum data rate of network resources; and generating a modified dynamic manifest for the video asset such that the representation recommended and as modified during said modifying step is recommended for the at least one of the chunks.

9. The method according to claim 8, wherein, during said modifying step, a representation providing a higher pre-determined level of video quality is selected for a chunk having at least one of available network bandwidth, available network storage, and current, average, peak, or minimum data rate of a pre-determined threshold.

10. A system of bitrate adaptation for a video asset to be streamed to a client device for playback, the video asset being deliverable in a sequence of chunks available in a plurality of different representations with each representation providing a different pre-determined level of video quality due to different bitrate or video resolution encoding, said system comprising electronic apparatus having at least one processor configured to:

select a representation from the plurality of different representations for at least one of the chunks of the video asset from an existing manifest which expresses a set of representations available for each chunk of the video asset; and generate a dynamic manifest for the video asset in which the representation selected for the at least one of the chunks is recommended for streaming to the client device; where the electronic apparatus is a dynamic manifest manipulator, wherein a selection of the representation recommended for the at least one of the chunks is based on each of data of historic viewing behavior of previous viewers of the at least one of the chunks of the video asset and data of content analysis information for the at least one of the chunks of the video asset, and wherein the data of historic viewing behavior provides an indication of a level of historic viewer interest of each chunk of the video asset and the data of content analysis information provides an indication of a level of at least one of importance, relevance, and activity of each chunk of the video asset.

11. The system according to claim 10, wherein said at least one processor being configured to select a representation providing a higher pre-determined level of video quality for a chunk having historic viewer interest of a pre-determined threshold or having at least one of importance, relevance, and activity of a pre-determined threshold.

12. The system according to claim 10, wherein the electronic apparatus is a network-aware manifest manager, wherein a selection of the representation recommended for the at least one of the chunks is based on at least one of a level of available network bandwidth, a level of available network storage, and data rate utilization information of network resources including at least one of current, average, peak, and minimum data rate of network resources.

13. The system according to claim 12, wherein said at least one processor being configured to select a representation providing a higher pre-determined level of video quality for a chunk having at least one of the level of available network bandwidth, the level of available network storage, and current, average, peak, or minimum data rate of a pre-determined threshold.

* * * * *